US006569277B1

(12) United States Patent
Gibbs

(10) Patent No.: US 6,569,277 B1
(45) Date of Patent: May 27, 2003

(54) ART OBJECT AND METHOD OF CREATION

(76) Inventor: Melinda Earl Gibbs, 12605 Prego Ct., San Diego, CA (US) 92130

( * ) Notice: Subject to any disclaimer, the term of this patent is extended or adjusted under 35 U.S.C. 154(b) by 0 days.

(21) Appl. No.: 09/778,597

(22) Filed: Feb. 7, 2001

Related U.S. Application Data

(63) Continuation-in-part of application No. 09/207,396, filed on Dec. 8, 1998, now abandoned.
(60) Provisional application No. 60/091,727, filed on Jul. 6, 1998.

(51) Int. Cl.[7] ......................... B44C 1/175; B32B 31/20; B41M 3/12; B44F 5/00; B44F 11/02
(52) U.S. Cl. ....................... 156/240; 156/230; 156/236; 156/247; 156/277; 156/289; 427/146; 427/147; 427/149; 428/42.1; 428/195; 428/202; 428/914
(58) Field of Search ................................ 156/230, 234, 156/236, 238, 239, 240, 241, 237, 247, 277, 289; 427/146, 147, 148, 149; 428/195, 200, 202, 203, 343, 914, 915, 42.1, 346

(56) References Cited

U.S. PATENT DOCUMENTS 4,770,732 A * 9/1988 Steelman .................... 156/236
6,153,038 A * 11/2000 Brooker ...................... 156/230

* cited by examiner

*Primary Examiner*—J. A. Lorengo
(74) *Attorney, Agent, or Firm*—Lawrence E. Crowe

(57) ABSTRACT

A method allowing high definition printing of images including photographic prints and computer images onto a variety of natural and man made substrates to create unique art objects and articles of manufacture that would otherwise be difficult or impossible to create. The process can even be utilized to transfer high definition images to such unlikely materials as tree leaves, making it possible to create highly unique art objects, and utilitarian objects such as place marker "leaves" at a dinner table.

16 Claims, 6 Drawing Sheets

(3 of 6 Drawing Sheet(s) Filed in Color)

ART OBJECT AND METHOD OF CREATION

This application is a Continuation in Part of U.S. Non-provisional application serial No. 09/207,396, filed Dec. 8, 1998, now abandoned, claiming priority to U.S. Provisional Application serial No. 60/091,727, filed Jul. 6, 1998.

FIELD OF THE INVENTION

This invention relates to an art object, and more particularly to an art object having an image displayed on a surface of a substrate, such as stone, plaster, or a tree leaf, and a method for creating the art object by creating the image on a transfer sheet in the form of a computer printer transparency sheet, and transferring the image from the transparency sheet to the surface of the art object.

BACKGROUND AND SUMMARY

It was my desire to create an art object of strikingly unique appearance having an image created by a variety of arts including drawing, painting, photography, computer imagery, or a combination of these arts, permanently deposited on the surface of a wide range of naturally occurring and man made substrate materials including plaster, concrete, drywall, marble, stone, cork, leaves, Plexiglass™, glass, fabric, leather, plastic, metal, wood, paper, and/or paper products, ceramics and painted surfaces.

It was also my desire to develop a method for conveniently creating such an art object in a manner that could be practiced by artists using equipment and materials commonly available in the consumer marketplace at reasonable cost. And it was my further desire to develop a method that could utilize computers and computer printers so that original photographs and works of art could be duplicated without destruction and transferred to a new substrate material, and be modified in appearance, in creating the unique art objects that I desired to produce. It was also my desire to develop a method by which an artist or a photo shop operator could quickly and inexpensively create a series of proofs, using different colors or artistic treatments, and allow a customer to preview the final art object prior to the step of permanently affixed to the substrate material.

One difficulty that had to be dealt with is that many of the substrate materials that I envisioned using, such as slabs of stone or plaster, leaves, drywall panels, concrete walls, pillars, doors, or windows, could not be passed through standard consumer computer printer equipment. Another difficulty was that the surfaces of these substrate materials were in many cases resistant to accepting an image of high resolution, or even an image of low resolution, for that matter.

Yet another difficulty was that I was envisioning an art object that might include several sequentially applied layers of different types of media, some of which were opaque, and some of which were relatively transparent and would allow features in the substrate, such as veining in marble, to show through. While it seemed possible to apply these layers sequentially "from the bottom up" on the substrate, a tremendous amount of pre-planning would be involved, and some form of registration system might need to be devised to keep various layers in proper alignment. Working from the bottom up directly on the surface of the substrate in sequential layers would also make it difficult to experiment with alternate colors and effects, and preclude the possibility of allowing a customer to choose between several proofs.

To overcome the difficulties addressed above, I envisioned my method generally including the steps of generating a source image on, or transferring a source image to, a carrier sheet, in the form of a computer printable transparency sheet, to make a carrier image on the transparency sheet, and then transferring the carrier image to a destination surface of one of the materials mentioned above to create the art object that I desired to create. I also contemplated that in creating the unique art object I envisioned, I might wish, in some instances, to modify the carrier image while it was on the carrier sheet, prior to transferring the carrier image to the surface of the substrate, and in yet other instances that I might wish to modify the carrier image after it was permanently transferred to the substrate surface.

As described below, my initial attempts at producing the type of art object that I envisioned by this process were unsuccessful, however. Success was achieved only after a lot of experimentation, and discovering that certain components of standard computer transparency printing needed to be significantly modified or replaced by alternative materials and processes.

Although the method that I envisioned is similar in some respects to known methods for affixing an image to a substrate through a series of steps, which typically involve, creating a source image, transferring the source image to a carrier in the form of a transfer sheet of paper or plastic to form a carrier image, and transferring the carrier image to a destination surface to form a destination image, none of these was entirely satisfactory in producing the art object that I envisioned. Simply stated, they did not produce the unique art object that I envisioned, and generally were unsuitable in terms of achieving my goal of producing my art object in a convenient manner with equipment and materials commonly available in today's consumer marketplace at reasonable cost.

For example, U.S. Pat. No. 470,899, issued to Robinson in 1899 discloses a Method for Decorating Wood and Other Surfaces, in which an original image created on a piece of paper is transferred to a receiving surface prepared with a previously applied coating of shellac or some other resinous or gummy material capable of being dissolved by a chemical—such as wood alcohol. The original image is printed, painted, or otherwise applied to the sheet of paper. A transfer sheet is created by coating one side of a sheet of plain white paper with a coating of the same shellac or resinous or gummy material used to prepare the receiving surface.

The transfer of the original image in Robinson's method is accomplished in two steps. In the first step, the sheet of paper upon which the original image is applied, is immersed in a bath of wood alcohol, and pressed into intimate contact with the transfer sheet, with the wood alcohol dissolving the image and the coating on the transfer sheet such that the image is transferred from the paper to the coated surface of the transfer sheet, and then removing the sheet of paper upon which the original image was applied in flakes or fragments. In the second step, the transfer sheet with the transferred design is immersed in the same solvent and pressed in intimate contact with the shellac coating on the receiving surface, and the transfer sheet removed in flakes and fragments to leave the image on the surface.

Robinson discloses that in some instances it is possible to dispense with the transfer sheet and apply the original—saturated in solvent—directly to the shellacked surface of the body to be decorated, or when the body to be decorated is a material such as celluloid which is softened by the solvent, that the step of shellacking the surface can be eliminated. Robinson further discloses that the solvents other than wood alcohol can be used in practicing his method, and that in some cases the solvent may be applied to the surface to be decorated before the transfer sheet is applied to it.

Although the method of Robinson was similar to the method that I envisioned, it was unsuitable for producing the art object I desired to produce for several reasons. Robinson's method involved the use of materials that were not compatible with some of the types of original images that I wished to transfer, such as photographs and computer generated images, and in general, the process did not appear to be capable of producing the level of detail necessary for transferring photographs and originals having fine detail. Robinson discloses the use of his method for transferring pictures printed from wood-cuts in ordinary printing ink, ordinary lithographs printed in colors, water color designs painted by hand, and prints or impressions made from steel engravings, but makes no mention of photographs, and of course computer generated designs of extremely fine resolution were completely unknown in 1899 when the Robinson patent issued.

The solvent dissolvable coatings—of a gummy resinous nature, such as shellac—would also be totally unsuitable for use on some of the substrates, such as leaves, that I wanted to use in creating the art objects that I envisioned, because they would destroy or undesirably alter the appearance or nature of the substrate. The Robinson method is also too complex and involves the use of volatile materials such as shellac, and the tedious process of removing the transfer sheet and/or original sheets in flakes or fragments.

U.S. Pat. No. 4,770,732 to Steelman, issued in 1988, discloses a Transfer Method for Applying Graphics to a Display Surface. Steelman forms a graphic by applying a special liquid mixture of a matrix resin, a binder resin, and a light altering agent to a relatively thick (0.125 mm) low-adhesion carrier web, using a conventional technique such as screen printing, spray painting, or knife coating. The graphic is solidified or cured on the low-adhesion carrier web. The solidified graphic is then wetted with a fluid to at least partially dissolve the binder matrix in the graphic, by applying the solvent to a display surface to which the graphic is to be attached, such as a metal plate or a retail store window, and pressing the graphics against the display surface. After a bond has developed between the display surface and the graphics which is stronger than the bond between the graphic and the low adhesion carrier web, the carrier web is peeled away, leaving the graphic attached to the display surface.

Steelman was unsuitable for producing the art object that I envisioned for several reasons. The liquid mixture, the carrier sheet, and the equipment required to generate the image on the carrier sheet would not be readily available to artists in the consumer marketplace. Generating an image with very fine detail, such a photograph or a computer generated image would require complex mixing and application of Steelman's special liquid mixture, assuming arguendo that Steelman's process were even capable of producing images having such fine detail. Steelman provides no disclosure that such fine detail can be achieved using his method. The carrier sheets of Steelman are also 25% thicker than the typical computer transparency sheets, and of low-adhesion to the graphic, which would create problems in applying the image using a computer printer, as I envisioned.

My initial attempts to create the art object that I envisioned centered around using standard, "off-the-shelf" computer ink-jet printers available in any consumer store for $300.00 or less, together with standard transparency sheets commonly available in office supply stores and in-jet ink cartridges designed and recommended by the printer manufacturers for use with these transparency sheets. I would print an image onto the transparency sheet, add enhancements of acrylic or oil-based paint, spray on a thin coating of a solvent, apply the wetted image to the surface of the substrate and press or rub the exposed side of the transparency sheet to cause the image on the wetted surface to transfer from the transparency sheet to the substrate, peel off the transparency sheet, and blot any residue left on the substrate from coatings on the transparency sheets.

As shown by U.S. Pat. No. 4,956,230 for an Ink Receptive Transparency Sheet, and U.S. Pat. No. 5,422,659 for a Method of Printing on a Transparency Sheet, ink-jet printers and pen plotters typically use a hydrophilic solvent-based (i.e. water based) inks. Transparency sheets for use with such ink-jet computer printers have a thickness of about 4 mils (0.004 in; 0.102 mm), and have a coating which is receptive to the hydrophilic solvent in the ink. The result of this combination is a sheet with high adhesion of the ink image to the transparency sheet, as contrasted to the low-adhesion coating of Steelman. There is also no need for the person creating the image to pre-treat the carrier sheet, as in Robinson, or to make special liquids as in Steelman. But my early attempts to utilize typical transparency sheets adapted for use in ink-jet printers for creating the art object that I envisioned were not satisfactory. The water based inks used in typical ink-jet printers became too runny to transfer a crisp image, even when using solvents such as denatured alcohol that did not contain water.

Results varied widely between different brands of transparencies and ink cartridges, and with the solvent used. I eventually determined that denatured alcohol seemed to be the best solvent, but the transferred image was not as clear as I needed it to be, no matter how careful I was in making the transfer. In time I determined that the basic problem seemed to be the ink-jet ink itself. For some manufacturers the black lines would stay crisp and clear with the colors bleeding unacceptably, and for other manufacturers the reverse was true.

I noticed, however, that when I used waterfast materials such as acrylic and oil-based paints, or waterfast and water resistant inks, which the transparency had not been designed to accept, the image did not seem to suffer from bleeding, as did the inks specifically designed for use in the computer printer with transparencies. The solution seemed to be to replace the inks normally used with ink-jet printers, on transparencies, with a more waterfast material.

In addition to being waterfast, I needed an ink that was also colorfast so that its color did not change or fade over time. This caused me to focus on pigmented inks.

I found that manufacturers did not supply ink-jet cartridges with waterfast ink for use in the small, inexpensive ink-jet printers that I desired to use, and for some types of ink-jet printers, the printer manufacturers specifically recommended using their pigmented inks only on waterproof media and in very expensive large format printers.

The only inks that I was able to find which appeared to be potentially suitable for use with my method were inks designed for use in large format commercial pen plotters and printers, typically selling for $10,000 to $30,000 dollars US. These machines were far too expensive to meet my goal of providing a method that could be practiced by individuals or photo shops at a reasonable cost. These machines and inks were designed to plot or print on surfaces such as paper or materials such as TYVEK™, and not on transparency film of the type that I wanted to use.

There was also an additional problem to be solved in that the manufacturers of some brands of low cost ink-jet printers having micropiezo ink delivery systems specifically warned against using pigmented inks in their machines. Despite these admonitions, I purchased bulk quantities of the water-fast ink designed for use in large format printers on surfaces other than transparencies, and used it to fill empty ink-jet printer cartridges designed for use with hydrophillic solvent-based ink-jet inks.

After considerable experimentation, I developed the method described herein for creating the art object that I envisioned by applying waterfast inks developed for large format printers on surfaces other than transparency film, and other commercially available water resistant materials, to transparency sheets of the type typically used in ink-jet printers designed for use with water based inks, and then using a non-water based solvent, such as denatured alcohol, to soften the image for transfer to the surface of a substrate. The transferred image is of very high resolution and suitable for use with images including photographic prints or computer generated images. The cost of the equipment and supplies required is very reasonable.

My method also allows me to quickly and inexpensively create an image on a transparency sheet, and then to modify that image after it is created on the transparency sheet with additional layers of water resistant or non-water resistant materials applied to the image on the transparency, to create special effects, or to help keep coloration on the surface of a substrate such as travertine marble from being visible through the image after it is transferred the substrate. The resultant image is also joined to the substrate very tightly, and can be further modified by applying tints, other materials to the image on the substrate for enhancing or adding additional artistic effects.

Because my method allows images to be so quickly and inexpensively printed and modified on the transparency sheet, a person performing my method can prepare several alternate images on separate transparency sheets and compare the final appearance of the images on a given display surface of a substrate by overlaying the separate transparency sheets on the display surface prior to actually transferring the image from a selected transparency sheet to the display surface. This provides significant advantage over other methods of affixing an image to a substrate working “from the bottom up” with layers of materials applied sequentially to the substrate. The image can be modified considerably before actual affixation to the substrate, by allowing the finished product to be previewed, and further modified if desired, prior to actually affixing the image to the substrate. An artist or photo shop performing my method can thus quickly and inexpensively generate a series of “proofs” having different images which can be viewed overlying the substrate by a client or customer, prior to affixing the image to the substrate, thereby allowing a means for the client or customer to select the image that they prefer for the finished product.

My method allows high definition printing of images including photographic prints and computer images onto a variety of natural and man made substrates to create unique art objects and articles of manufacture that would otherwise be difficult or impossible to create. My process can even be utilized to transfer high definition images to such unlikely materials as tree leaves, making it possible to create highly unique art objects, and utilitarian objects such as place marker “leaves” at a dinner table.

These and other aspects, advantages, and novel features of my invention will be readily apparent upon consideration of the following drawings and detailed description of preferred embodiments.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION

Figure 3:
FIG. 3 is a color photograph of an art object according to my invention.

FIG. 3 is a color photograph of a first art object according to my invention, having a photographic image in sepia tones of a classic statue affixed to a display surface on a substrate of Travertine marble. The image was first printed onto a transparency sheet, such as one sold in office supply stores and other retail outlets under the trade name “HP Premium Inkjet Transparency Film, part number C3828A, by the Hewlett Packard Company of Palo Alto, Calif., using a waterfast ink, such as one sold under the trade name ENCAD® Graphic Outdoor (GO) Matched System™ pigmented ink.

Although the manufacturer recommends that the ENCAD® Graphic Outdoor (GO) Matched System™ pigmented ink be used only with “GO Media and Laminates” such as water resistant vinyl, reinforced vinyl, polyethylene, TYVEK, and wet-strength paper, and in processes typically requiring expensive large format printers, I have found that these inks can also be used on transparency sheets of the type commonly available in retail office supply stores, run through an inexpensive ink-jet printer of the type sold to consumers for use with personal computers. I purchase the ENCAD® (GO) pigmented ink in bulk and use it to fill empty ink-jet print cartridges which are then installed and used in the normal fashion on a desktop ink-jet printer for generating the image an a sheet or roll of transparency film.

I have also successfully used ink sold under the trade name of “Accuplot Pigment Bulk Ink, available from Mile High Engineering Supply Co., Inc.” Data sheets from the supplier state that these inks are waterproof when applied on waterproof substrates, and perform well on most inkjet media, but recommend that these inks be used with corresponding waterproof substrates and be applied using large format printers which cost upwards of $10,000. Despite the supplier’s recommendations, I have found that these inks are sufficiently water resistant and waterfast for my purposes even when applied to transparency sheet materials having a coating which is not waterproof by low cost ink-jet printers.

The two inks described above are the only inks that I have discovered to date which consistently allow reproduction of images having fine detail, such as a photographic print or a computer image, using my methods. The image created on the transparency by these inks is relatively transparent, thereby allowing coloration of the display surface of the substrate to show through the printed image.

After the image of the first art object, illustrated in FIG. 3, was printed onto the transparency sheet, I modified the image by airbrushing a layer of ivory colored acrylic paint over portions of the image, such as the face and body of the man in the statue, where I wished to totally or partially diminish the visibility of markings on the display surface of the marble substrate through the printed image. I then further modified the image by rubbing an oil-based, orange colored pastel paint over portions of the image to form another layer of the image and add a highlighting effect around the image of the statue.

I then sprayed the layered image and non-waterfast coating on the transparency sheet with denatured alcohol and allowed the coating and image to soften partially before placing the wetted image and coating into intimate contact with the display surface of the marble substrate. I pressed the transparency sheet against the display surface and selectively rubbed the exposed surface of the transparency to ensure that the image would come into intimate contact with the display surface despite the presence of small variations, fossils, or other holes in the surface of the marble substrate.

After waiting a time sufficient to allow adhesion of the image to the display surface, I carefully peeled away the transparency sheet, leaving the image and a portion of the coating of the transparency sheet affixed to the display surface. I then carefully blotted and wiped away excess coating material and allowed the image to dry.

For the art object of FIG. 3, I did not apply further layers of media to the image after it was affixed to the display surface, but could have done so prior to or after the drying the image, had I wished to further modify the image. The resulting image, created and transferred as described, above adheres tightly to the substrate, and is resistant to scratching, but can be readily washed off of a surface such as marble which does not readily accept the application of either waterfast or non-waterfast media. It is my belief that the portion of the non-waterfast coating material transferred from the transparency sheet to the substrate greatly increases the adhesion of the image to the substrate. To ensure that the image would stay affixed to the display surface if exposed to moisture, I sprayed a layer of Krylon brand matte finish, of the type commonly used by artists for this purpose, over the transferred image.

Figure 4:
FIGS. 4–6 are black and white photographs of art objects according to my invention.

FIG. 4 is a black and white photograph of a second art object created in a similar fashion to the first art object described above. In the art object of FIG. 4, a photographic image of a woman is generated on a transparency sheet, and areas of the image, such as the woman's face, clothing, sunglasses, etc., are airbrushed for artistic effect and to diminish or hide the markings on the display surface of the stone substrate to which the image is affixed.

Figure 5:
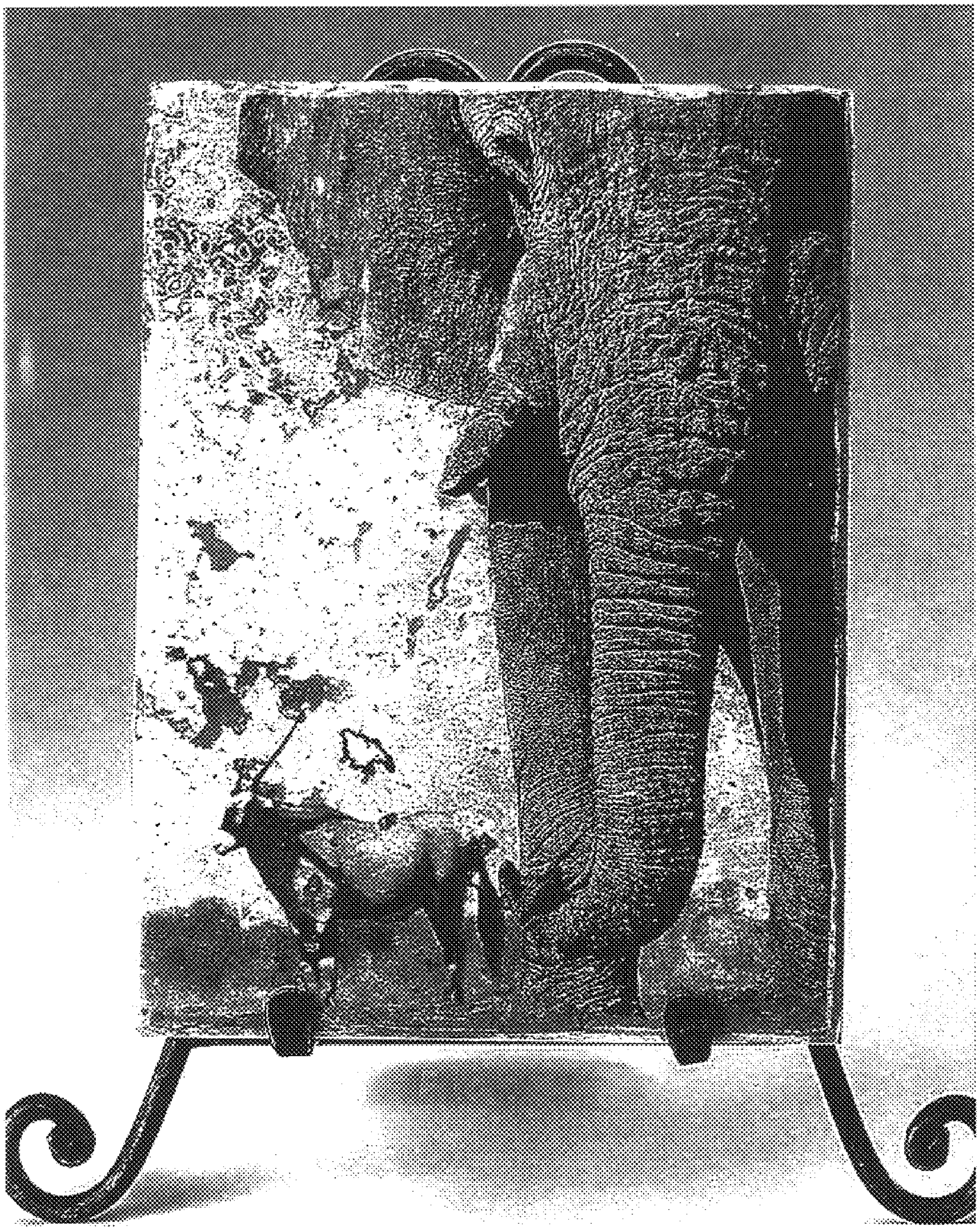

FIG. 5 is a black and white photograph of a third art object created according to my invention, illustrating the manner in which computer images of animals from several photographs can be combined into a single image by passing the transparency sheet through the printer multiple times and printing a different image on the transparency in successive layers.

Figure 6:

FIG. 6 is a black and white photograph of a fourth art object created according to my invention using the techniques described above on a specially fabricated substrate having a display surface in the form of a piece of folded cloth embedded in a slab of cast plaster. As will be readily understood by those having skill in the art, my invention can produce highly unique art objects having high resolution images affixed to a virtually unlimited variety of natural and man-made substrates.

The art object of FIG. 6 also serves as a wonderful example of the advantages provided by my invention in allowing clients, such as the couple in the photo, for example, to view and choose from several different "proof" transparency images having various artistic treatments, colorations, or modifications, by overlaying each proof on the substrate, prior to having the selected image be actually affixed to the substrate. For unique substrates, such as the one shown in FIG. 6, this provides the person practicing my method and producing an article of manufacture with a great advantage of not needing to risk damage to a unique substrate which might occur in conventional "from the bottom up" methods of creating an image on a substrate, requiring successive affixing and removal of images in the process of allowing the client to personalize and participate in selecting the final appearance of the article manufactured.

Although I have described and depicted my invention in a number of exemplary embodiments, those having skill in the art will recognize that many other embodiments are possible and contemplated within the scope of the appended claims. Specifically, although the description above has been restricted to a method of producing an art object having an image deposited upon a generally flat and smooth surface of a substrate, my method can be used for producing images of fine definition and including unique artistic effects that have heretofore been difficult or impossible to achieve on curved surfaces, such as souvenir drinking glasses or ashtrays, on window displays, signs, badges, and a virtually unlimited range of other utilitarian and display objects. I also wish to expressly state that my focus herein on the use of consumer ink-jet printing equipment does not exclude the practice of my invention, utilizing the combination of waterfast media on transparency or other materials designed for use with hydrophillic solvent-based inks that I have described herein with commercial printers.

Figure 1:
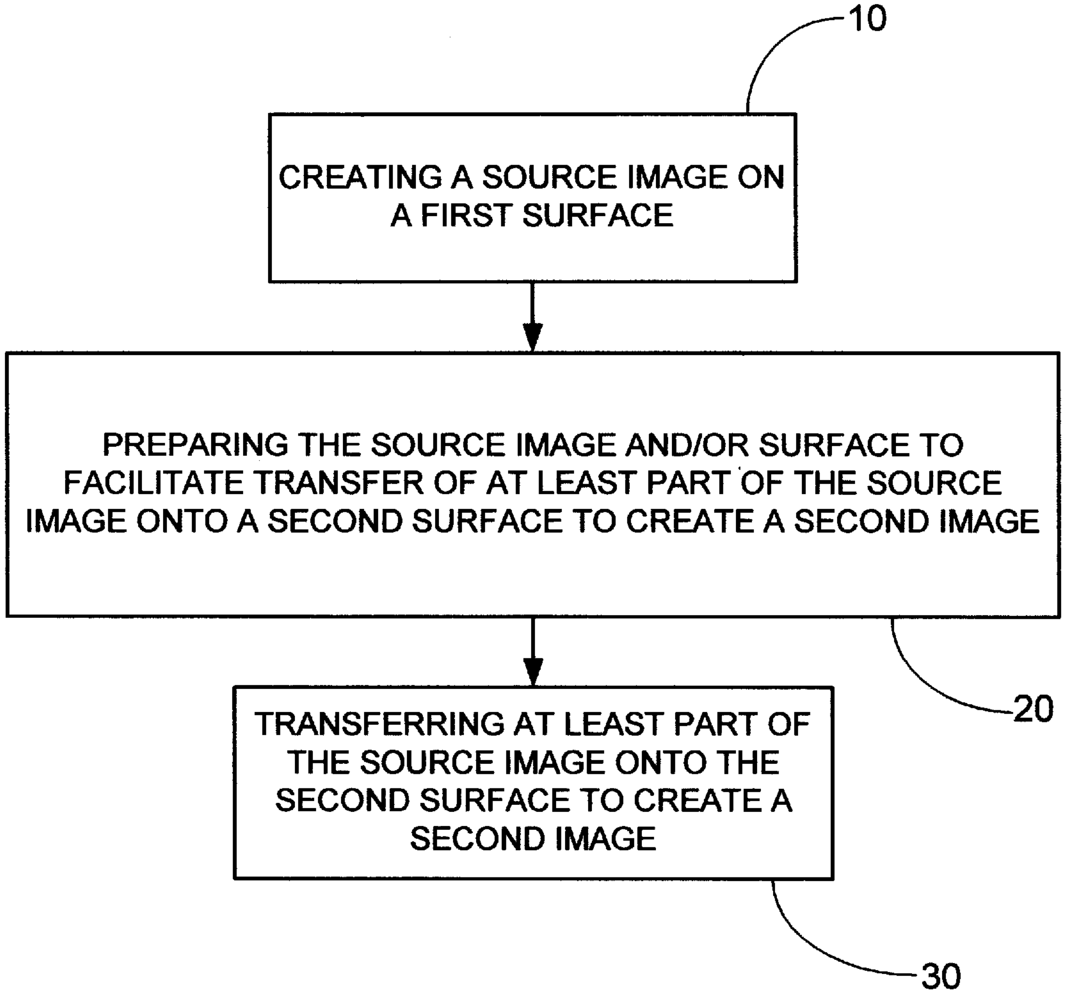
FIG. 1 is a schematic depiction of a first embodiment of a method according to my invention.

Referring to FIG. 1, my method of image creation includes: step 10,creating a source image 10 of waterfast media on a first surface in the form of a transparency film adapted for use in an ink-jet printer having hydrophilic solvent-based inks; step 20, preparing the source image and/or a second surface in the form of a display surface of a substrate to which the source image is to be applied to facilitate transfer of at least part of the source image onto the display surface; and step 30, transferring at least part of the source image onto the second surface to create a second image.

The step of creating a source image can be accomplished by any known method for image creation including, but not limited to applying media such as ink, markers, paints, wax based products, or a combination thereof to the first surface. These products can be applied in a single layer, or in successive multiple layers to create the source image. Wax based products include but are not limited to crayons. The term "paints" includes but is not limited to acrylic polymer emulsion paint, oil and alkyd paints, tempura, and gauche paints. Application methods include, but are not limited to, free-hand drawing or painting, printing via ink-jet digital or commercial printer, stamping via rubber stamps, airbrushing, spraying, or combination thereof. The first surface could comprise any material or combination of materials having a carrier sheet with a surface receptive to both hydrophilic solvent-based ink-jet printer inks, and waterfast media, and soluble in a solvent such as denatured alcohol which will soften the coating more readily than the media used in creating the image. It is preferred that the surface be of a nature so as to minimize transfer of surface residue to the second surface and to maximize the transfer of the media from the first surface to the second surface.

The step of preparing the source image and/or second surface includes applying a solvent or releasing agent to the first image so as to cause at least a portion of the first image to transfer to a second surface upon contact with the second surface. Any solvent or releasing agent may be used, but the choice of a particular solvent or releasing agent will depend on the media used to create the source image. Application of the solvent or releasing agent may involve spraying, brushing, and/or pouring of the solvent or releasing agent, or might involve at least partial submersion of the source image and/or second surface.

The step of transferring at least part of the source image onto the second surface includes placing the second surface in intimate contact with the prepared source image. It is contemplated that the contact between the second surface and the source image may need to be maintained for a time sufficient to allow transfer of the image. The second surface could be any known material or combination of materials regardless of composition or texture including, but not limited to, plaster, concrete, drywall, marble, stone, natural materials such as cork and leaves, glass, Plexiglass™, fabric, leather, plastic, metal, wood, paper and/or paper products, ceramics, and painted surfaces.

It is contemplated that in some instances the second surface may need to be prepared prior to receiving the liquified/released source image. Preparation methods will vary depending on the type of surface used but may include modifying the surface and/or coating the surface. Modifying the texture may include smoothing, possibly by sanding, or roughening, possibly through removal of material through the use of coarse sandpaper, knives, gauges, chisels, and/or through the addition of material using adhesives, fasteners or coatings. Coatings may include applying polyvinyl acetate, Liquitex™ Matte Medium, or a combination thereof.

It is also contemplated that the additional steps may be necessary after the image has been transferred to the second surface. Such steps might include either individually or in combination (1) removal of the first surface; (2) removal of any residue left behind by removal of the first surface; (3) modifying the transferred image; (4) insuring that the transferred image adheres to the second surface; (5) protecting the transferred image against later removal and/or degradation, possibly by drying or application of a protective coating.

Figure 2:
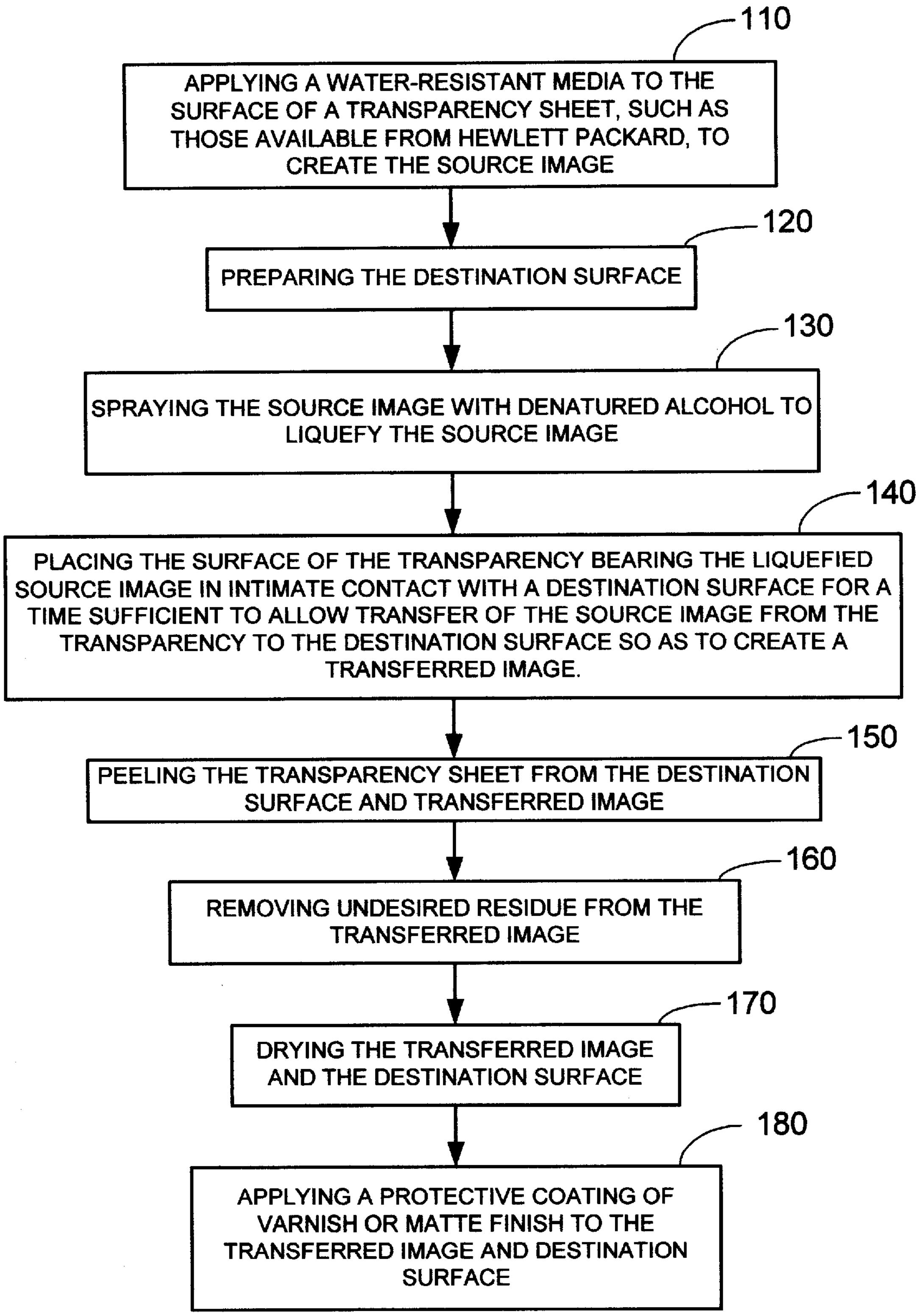
FIG. 2 is a schematic depiction of a second embodiment of a method according to my invention.

Referring to FIG. 2, a preferred form of my invention includes the step 110 of applying a water-resistant media to the surface of a transparency sheet, such as those available from companies such as Hewlett-Packard, to create the source image; step 120 of preparing the destination surface; step 130 spraying the source image with denatured alcohol to liquify the source image; step 140 of placing the surface of the transparency bearing the liquified source image in intimate contact with a destination surface for a time sufficient to allow transfer of the source image to the destination surface so as to create a transferred image; step 150 of peeling away the transparency sheet from the destination surface and transferred image; step 160 of removing undesired residue from the transferred image; step 170 of drying the transferred image and the destination surface; and, step 180 of applying a protective coating of varnish or matte finish to the transferred image and destination surface.

It is contemplated that the solvent or releasing agent might be applied to the second/destination surface and the treated image then placed in intimate contact with the second surface.

Thus, specific embodiments and applications of a method for image creation and transfer have been disclosed. It should be apparent to those skilled in the art, however, that many more modifications besides those already described are possible without departing from the inventive concepts herein. It is understood, therefore, that the spirit and scope of the appended claims should not be limited to the specific embodiments described and depicted herein.

I claim:

1. A method for creating an image adapted for transfer to a display surface of a substrate, said method comprising applying a first layer of waterfast medium to a surface of an ink-jet transparency sheet having a coating adapted to receive hydrophilic solvent-based ink to create an image on said transparency sheet, said first layer of waterfast medium being applied to the coated surface of the ink-jet transparency sheet.

2. The method of claim 1 further including the steps of:

wetting the surface of the substrate with a quantity of solvent sufficient to partially liquify said image and coating;

placing the surface of the ink-jet transparency having the image and coating in intimate contact with said display surface of said substrate for a time sufficient for the quantity of solvent on said substrate to at least partially liquify a portion of the image and coating and to transfer a portion of said image and coating from said transparency sheet to said substrate; and peeling away said transparency sheet.

3. The method of claim 1 including modifying said image with additional media applied to said display surface.

4. A method for creating an image on a display surface of a substrate, said method comprising:

a) applying a first layer of waterfast medium to a surface of an ink-jet transparency sheet having a coating adapted to receive hydrophilic solvent-based ink to create an image on said transparency sheet, said first layer of waterfast medium being applied to the coated surface of the ink-jet transparency sheet;

b) at least partially liquifying said image and coating on said ink-jet transparency sheet with a solvent;

c) placing the surface of the ink-jet transparency having the at least partially liquified image and coating in intimate contact with said display surface of said substrate for a time sufficient to transfer a portion of said image and coating from said transparency sheet to said substrate; and d) peeling away said transparency sheet.

5. The method of claim 4 wherein said step of applying includes printing said first layer of waterfast medium on said transparency sheet with an ink-jet computer printer.

6. The method of claim 5 wherein said first layer of waterfast medium is a waterfast ink.

7. The method of claim 5 further including modifying said image by applying a second layer of waterfast medium to the coated surface of the ink-jet transparency sheet.

8. The method of claim 7 wherein said first layer of waterfast medium is relatively transparent and said second layer is relatively opaque.

9. The method of claim 4 including applying to the coated surface of the ink-jet transparency sheet a second layer of a medium different from said first layer of waterfast medium.

10. The method of claim 9 wherein said second layer of medium is non-waterfast.

11. The method of claim 4 including the further step of modifying said image by adding one or more additional layers of medium to said coated surface of said transparency sheet prior to said step of partially liquifying.

12. The method of claim 11 wherein said first layer of waterfast medium is relatively transparent, and said display surface of said substrate has markings that would show through said first layer, further including applying at least a partial additional layer of relatively opaque medium to areas of said image to at least partially mask said markings of said display surface from showing through said image.

13. The method of claim 11 further including creating several alternate images on separate transparency sheets in accordance with step (a) and comparing the appearance of said separate sheets overlaid one at a time on said display surface prior to selecting one of said separate sheets for proceeding with said steps (b), (c), and (d).

14. The method of claim 4 further including the step (e) of modifying said image by applying additional medium to said image after said transparency sheet is peeled away.

15. The method of claim 14 wherein said additional medium is different from said first layer of waterfast medium.

16. The method of claim 4 including the additional step of fabricating said substrate.

* * * * *